United States Patent
Derybowski et al.

(10) Patent No.: US 8,940,260 B2
(45) Date of Patent: Jan. 27, 2015

(54) SUPPLEMENTAL AMMONIA STORAGE AND DELIVERY SYSTEM

(75) Inventors: Edward M. Derybowski, Hanover Park, IL (US); Brad J. Adelman, Chicago, IL (US); Shyam Santhanam, Aurora, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 0 days.

(21) Appl. No.: 14/125,191

(22) PCT Filed: Apr. 18, 2012

(86) PCT No.: PCT/US2012/033975
§ 371 (c)(1),
(2), (4) Date: Dec. 10, 2013

(87) PCT Pub. No.: WO2012/170117
PCT Pub. Date: Dec. 13, 2012

(65) Prior Publication Data
US 2014/0112851 A1    Apr. 24, 2014

Related U.S. Application Data

(60) Provisional application No. 61/495,485, filed on Jun. 10, 2011.

(51) Int. Cl.
*B01D 53/92* (2006.01)
*B01D 53/94* (2006.01)
*F01N 3/10* (2006.01)
(Continued)

(52) U.S. Cl.
CPC .............. *B01D 53/92* (2013.01); *B01D 53/90* (2013.01); *B01D 53/9409* (2013.01); *B01D 53/9495* (2013.01); *F01N 3/208* (2013.01);
(Continued)

(58) Field of Classification Search
USPC ........... 423/213.2, 213.5, 213.7; 60/274, 295, 60/299, 301
See application file for complete search history.

(56) References Cited

U.S. PATENT DOCUMENTS 7,700,058 B2 *  4/2010  Kanda et al. .................. 423/235
8,329,127 B2 * 12/2012  Cox ........................... 423/213.2
(Continued)

*Primary Examiner* — Timothy Vanoy
(74) *Attorney, Agent, or Firm* — Jeffrey P. Calfa; Mark C. Bach

(57) ABSTRACT

An exhaust after-treatment system is described. Generally speaking, the system includes separate primary and secondary $NO_x$ reducing systems for delivering reductant (e.g. urea and ammonia) to an exhaust stream, a sensor system for determining relevant operating conditions and an electronic control module for activating the reducing systems. The two $NO_x$ reducing systems include flow control modules coupled to the electronic control module. Methods for reducing $NO_x$ in an exhaust stream are also described. Generally speaking, the methods include the steps of determining a need for $NO_x$ reduction in an exhaust stream, determining temperature of exhaust stream, and injecting at least one of a primary reductant and a secondary reductant into the exhaust stream based on the determined temperature of the exhaust stream. Typically, the primary reductant comprises urea and the secondary reductant comprises ammonia.

12 Claims, 3 Drawing Sheets

(51) Int. Cl.
*B01D 53/90* (2006.01)
*F01N 3/20* (2006.01)
*F01N 3/18* (2006.01)

(52) U.S. Cl.
CPC ............ *F01N 3/18* (2013.01); *B01D 53/9477* (2013.01); *B01D 2251/2062* (2013.01); *B01D 2251/2067* (2013.01); *B01D 2251/208* (2013.01); *B01D 2258/012* (2013.01); *F01N 2610/02* (2013.01); *F01N 2610/06* (2013.01); *Y02T 10/24* (2013.01)
USPC .................. 423/213.2; 423/213.5; 423/213.7; 60/274; 60/295; 60/299; 60/301

(56) References Cited

U.S. PATENT DOCUMENTS

| | | | | |
|---|---|---|---|---|
| 8,551,432 | B2 * | 10/2013 | Adelman et al. | 423/212 |
| 8,713,919 | B2 * | 5/2014 | Gonze et al. | 60/295 |
| 2007/0033928 | A1 * | 2/2007 | Hu et al. | 60/286 |
| 2009/0035194 | A1 * | 2/2009 | Robel et al. | 422/177 |
| 2010/0021780 | A1 * | 1/2010 | Johannessen et al. | 429/19 |
| 2011/0197569 | A1 * | 8/2011 | Salanta et al. | 60/286 |
| 2012/0067026 | A1 * | 3/2012 | Gonze et al. | 60/274 |
| 2012/0144802 | A1 * | 6/2012 | Driscoll et al. | 60/274 |
| 2012/0324868 | A1 * | 12/2012 | Kim et al. | 60/274 |

* cited by examiner

SUPPLEMENTAL AMMONIA STORAGE AND DELIVERY SYSTEM

CROSS-REFERENCE TO RELATED APPLICATIONS

This application claims the benefit of U.S. Patent Application Ser. No. 61/495,485 filed on Jun. 10, 2011.

TECHNICAL FIELD

The present disclosure relates to a system and method for treating an exhaust stream in a vehicle exhaust system. Particularly, the present disclosure provides a method for improving the reduction of nitrogen oxides ($NO_x$) in the exhaust gas stream through delivery of a suitable amount of reductant into a vehicle exhaust stream.

BACKGROUND

Diesel engines are efficient, durable and economical. Diesel exhaust, however, can harm both the environment and people. To reduce this harm, governments, such as the United States and the European Union, have proposed stricter diesel exhaust emission regulations. These environmental regulations require diesel engines to meet the same pollution emission standards as gasoline engines. Typically, to meet such regulations and standards, diesel engine systems require equipment additions and modifications.

For example, a lean burning engine provides improved fuel efficiency by operating with an amount of oxygen in excess of the amount necessary for complete combustion of the fuel. Such engines are said to run "lean" or on a "lean mixture." However, the increase in fuel efficiency is offset by the creation of undesirable pollution emissions in the form of nitrogen oxides ($NO_x$). Nitrogen oxide emissions are regulated through regular emission testing requirements. One method used to reduce $NO_x$ emissions from lean burn internal combustion engines is known as selective catalytic reduction (SCR). When used to reduce $NO_x$ emissions from a diesel engine, selective catalytic reduction involves injecting atomized urea into the exhaust stream of the engine.

The main components of an SCR system are a tank for storing Diesel Exhaust Fluid (DEF) and an injection system for delivering the DEF into the exhaust, as well as an SCR catalytic chamber for the $NO_x$ reduction to occur. An onboard diagnostic system monitors the DEF level and indicates when the storage tank needs to be refilled. However, while the DEF is a non-hazardous, high-purity, colorless solution containing 32.5% urea, its high water content (over 65% deionized water) makes DEF very susceptible to freezing in the DEF tank at cold ambient temperatures and difficult to vaporize in cool exhaust streams.

Because the fluid cannot be sprayed if it is frozen in the DEF tank and poor vaporization in cool exhaust streams leads to deposit formation, DEF is unusable in these conditions. Accordingly, in order to be in compliance with emission standards, alternate dosing is needed during such times. The present system and methods solve these and other problems associated with prior art $NO_x$ reduction systems.

SUMMARY

An exhaust after-treatment system is described and claimed. Generally speaking, the system comprises separate primary and secondary $NO_x$ reducing systems for delivering reductant (e.g. urea and ammonia) to an exhaust stream, a sensor system for determining relevant operating conditions and an electronic control module for activating the reducing systems. The two $NO_x$ reducing systems include flow control modules coupled to the electronic control module.

In an embodiment of the system, the sensor system sends inputs to the electronic control module representative of relevant operating conditions, such as flow rate, temperature, and the like. The electronic control module receives the sensor inputs and activates at least one of either the primary or the secondary flow control module based on those sensor inputs.

In an embodiment of the system, the secondary $NO_x$ reducing system comprises a refillable canister having a supply of ammonia, a heating element coupled to the refillable canister, tubing for fluidly connecting the refillable canister with vehicle exhaust and an injection system connected to the tubing for injecting ammonia into the vehicle exhaust.

Additionally, the supplemental $NO_x$ reduction device for use in a vehicle exhaust after-treatment system is also described and claimed. Generally speaking, the device comprises a refillable canister having a supply of ammonia, a heating element coupled to the refillable canister, a flow control module connected to the refillable canister for regulating the discharge of ammonia from the refillable canister, tubing for fluidly connecting the refillable canister with a vehicle exhaust, an injection system connected to the tubing for injecting ammonia into the vehicle exhaust, a sensor system for determining relevant operating conditions and sending inputs representative of the conditions, and an electronic control module for receiving sensor inputs and activating the flow control module based on sensor inputs.

In an embodiment of the supplemental $NO_x$ reduction device, the sensor system comprises at least one of an exhaust gas temperature sensor, an ambient temperature sensor, an exhaust gas $NO_x$ sensor, and a primary $NO_x$ reductant flow sensor. In one embodiment, the device is coupled to a vehicle exhaust line upstream of a primary reductant source and upstream of a SCR and/or a NPF ($NO_x$ particulate filter which is a DPF with SCR coating and no PGM).

Methods for reducing $NO_x$ in an exhaust stream are also described and claimed. Generally speaking, the methods comprise the steps of determining a need for $NO_x$ reduction in an exhaust stream, determining temperature of exhaust stream, and injecting at least one of a primary reductant and a secondary reductant into the exhaust stream based on the determined temperature of the exhaust stream. Typically, the primary reductant comprises urea and the secondary reductant comprises ammonia.

In an embodiment, the method comprises the further steps of injecting the primary reductant into the exhaust stream, determining the $NO_x$ level in the exhaust stream after injection of the primary reductant, and injecting the secondary reductant into the exhaust stream if the $NO_x$ level is below a threshold level. In one embodiment, the primary reductant is injected into the exhaust stream when the determined temperature of the exhaust stream is in the range of from about 200° C. to about 500° C. The secondary reductant can be dosed when any or all of the following conditions are satisfied: the exhaust temperature is outside of the range of about 200° C.-500° C., the ambient temperature is less than −11° C., or if the DEF tank is frozen (determined by actual sensing, calibrated values from a map or an algorithm).

DETAILED DESCRIPTION

Figure 1:
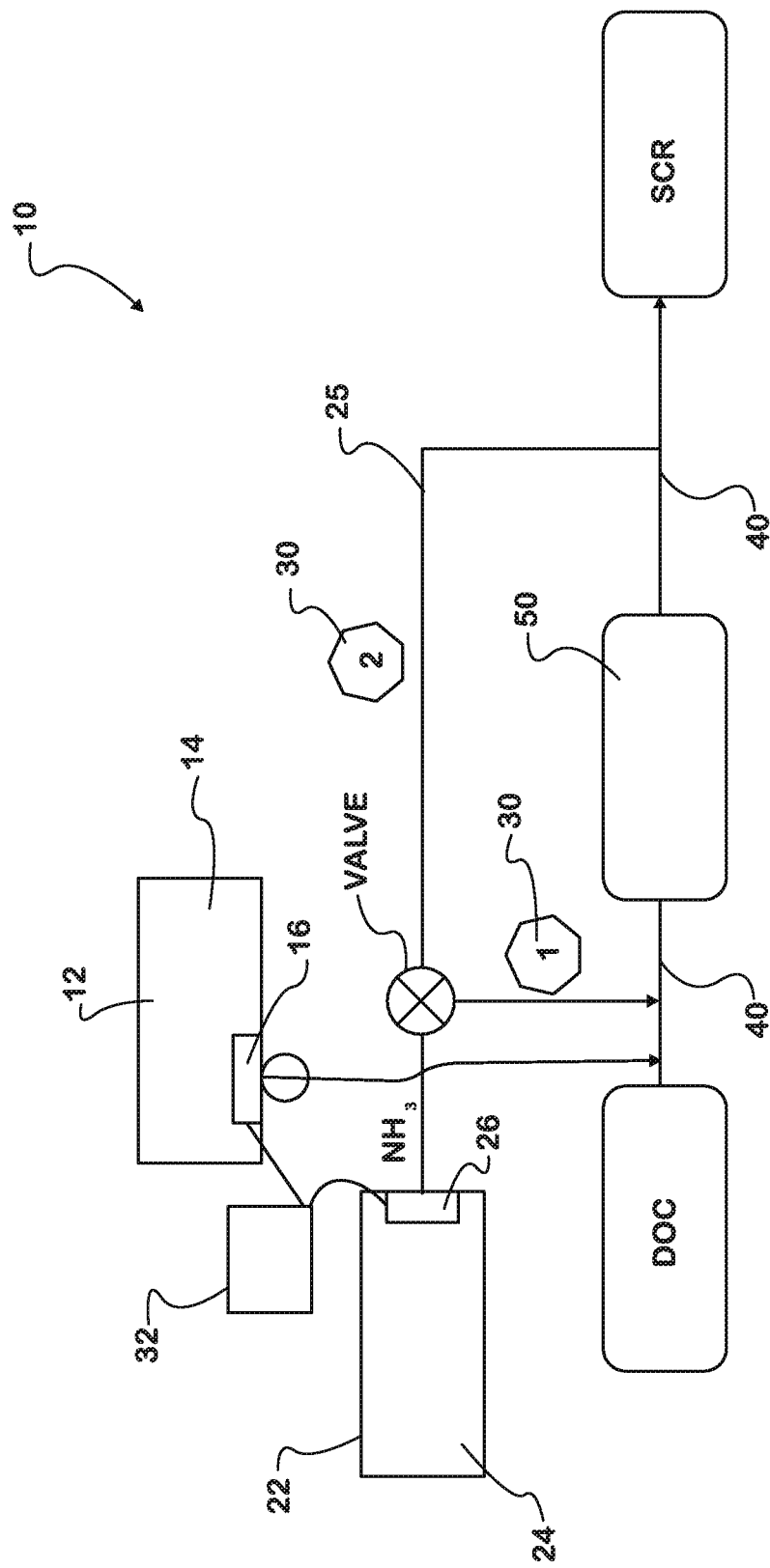
FIG. 1 is a schematic illustrating one embodiment of the present system.
Figure 2:
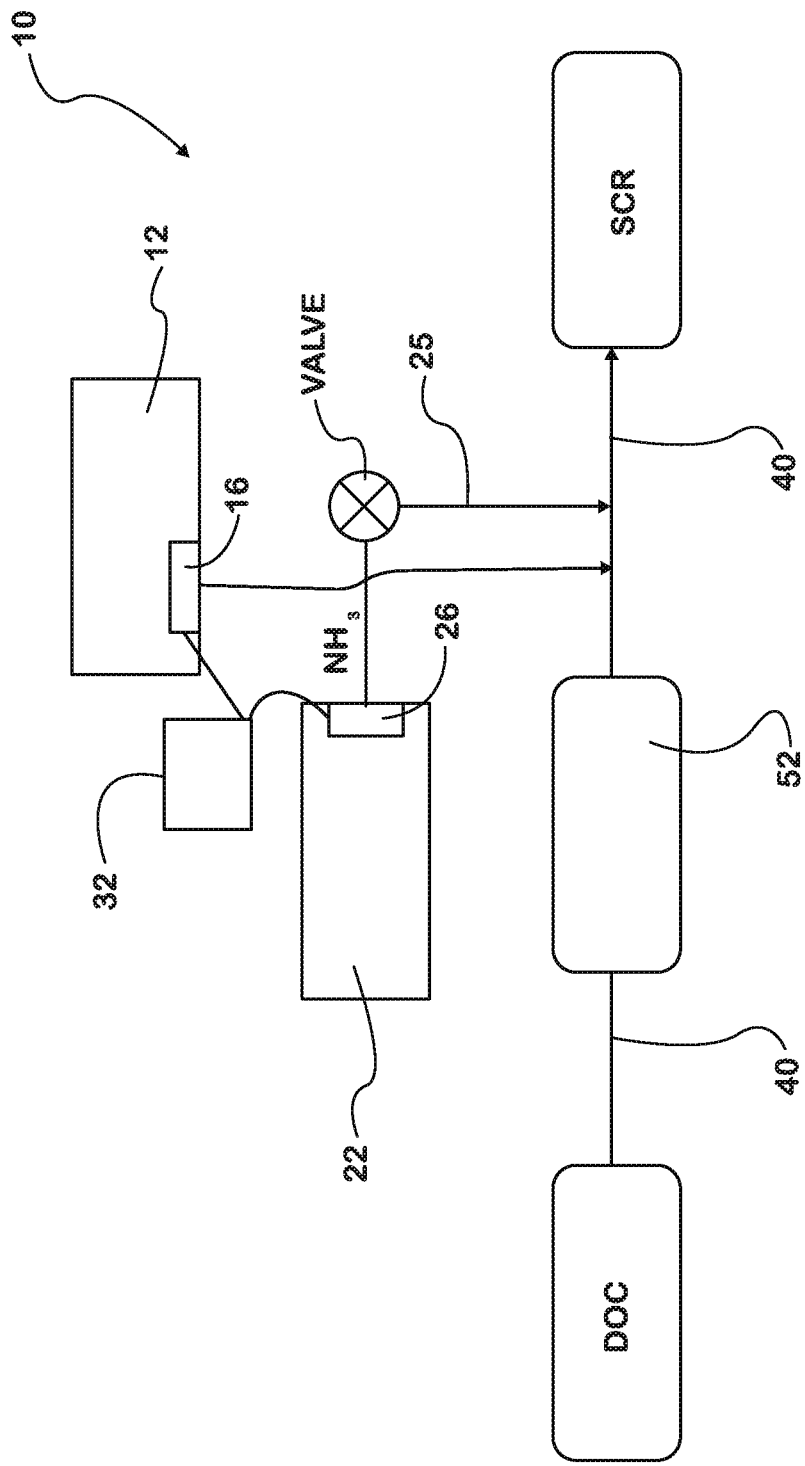
FIG. 2 is a schematic illustrating an alternate embodiment of the present system; and, FIG. 3 is a schematic illustrating yet another alternate embodiment of the present system.
Figure 3:
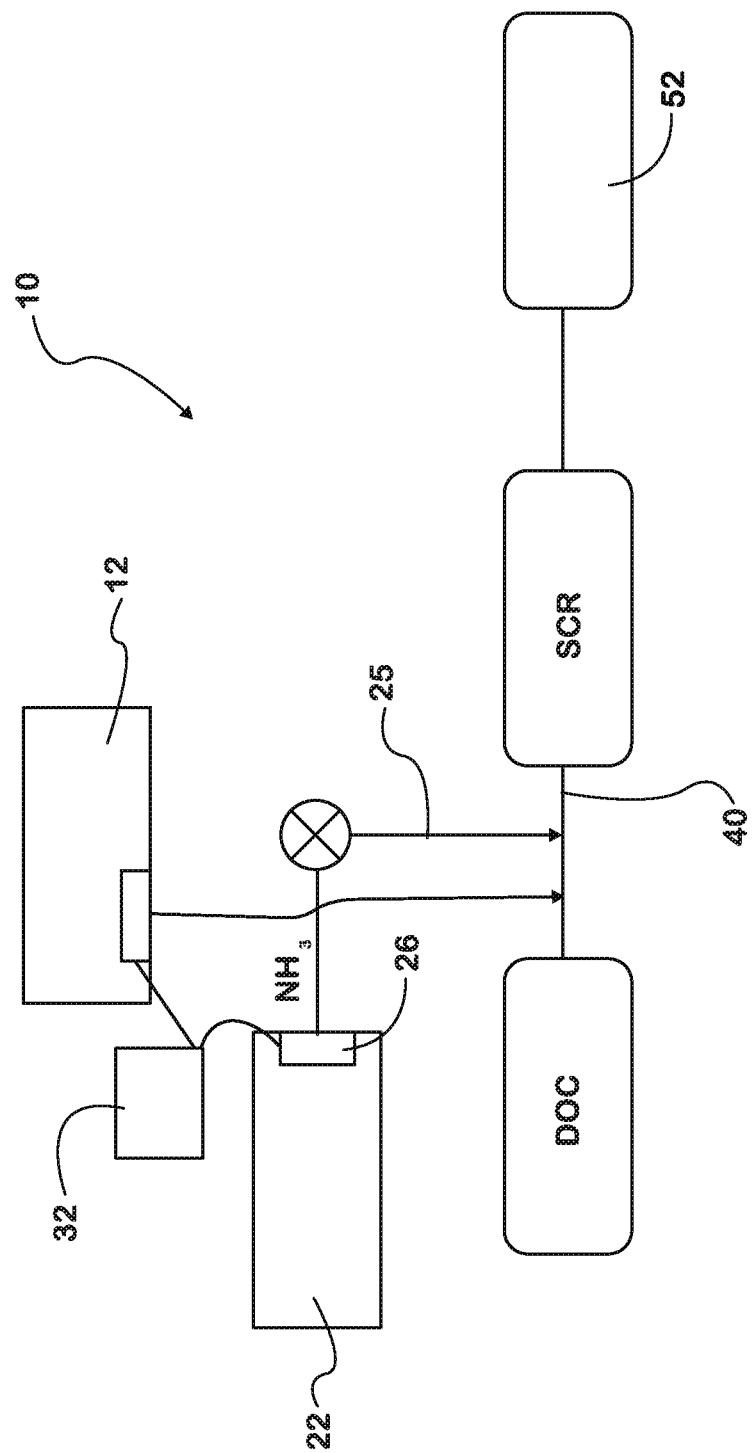

Referring to FIGS. 1-3, an exhaust after-treatment system 10 is illustrated. The system 10 comprises a primary $NO_x$ reducing system 12 which is used for delivering a reductant, such as liquid urea (aka, diesel exhaust fluid), to an exhaust stream 40. The primary system 12 includes a refillable tank 14 and a primary flow control module 16 which regulates the flow of reductant from the tank 14 into the exhaust stream 40. A secondary $NO_x$ reducing system 22 is also a component of the after-treatment system 10, and also delivers a reductant, in one embodiment ammonia, to the exhaust stream 40. The secondary system 22 includes a refillable tank 24 for storing the reductant, and a flow control module 26, coupled to the tank 24, which regulates the flow of reductant from the secondary system 20 into the exhaust stream 40.

A sensor system 30 is used for determining relevant operating conditions of the vehicle (not shown), particularly of the exhaust stream, and for sending electronic inputs representative of these conditions to an electronic control module 32. The electronic control module 32 receives the sensor system inputs and activates at least one of either the primary flow control module 16 or the secondary flow control module 26 based on the sensor inputs. Of course, conditions may exist where the electronic control module 32 receives inputs which result in neither of the modules being activated.

As illustrated, the primary system 12 will dose DEF from the primary system 12 into the exhaust stream 40 upstream of the NPF 50. The sensor system 30 comprises at least one of a selection of sensors including an exhaust gas temperature sensor, an ambient temperature sensor, an exhaust gas $NO_x$ sensor, and a primary $NO_x$ reductant flow sensor. The selected sensor(s) is/are coupled to the appropriate system component and to the electronic control module 32 to deliver information which then is used to determine which of the flow modules, if either, to activate.

For example, the DEF will only be dosed into the exhaust from the primary system 12 when the exhaust temperature is within the range of from about 200° C. to about 500° C. That requirement excludes vehicle cold starts, in which case, the secondary system 22 will be used to dose ammonia into the exhaust stream 40 for $NO_x$ reduction.

As shown, the secondary system 22 may inject ammonia upstream of the NPF 50 or downstream of the NPF 50. The latter scenario being used when the temperature of the NPF 50 is too high for desired conversion efficiency—e.g., during periods of active regeneration of the DPF. The secondary system 22 will also dose upstream of the NPF 50 when an ambient temperature sensor indicates a sub-threshold temperature (e.g., −11° C.) resulting in a frozen DEF tank 14. Also, as mentioned, the secondary system 22 will dose ammonia into the exhaust stream 40 downstream of the NPF 50 during active regeneration of a diesel particulate filter (DPF).

Another situation which may call for dosing from the secondary system 22 is when the $NO_x$ level is so high the primary system 12 is unable to sufficiently reduce the $NO_x$ to an acceptable level. The secondary system 22 may then be activated by the electronic control module 32, via the flow module 26, to assist the primary system 12.

The secondary $NO_x$ reducing system 22 comprises a refillable canister 24 having a supply of ammonia, a heating element (not shown) coupled to the refillable canister 24, tubing 25 for fluidly connecting the refillable canister 24 with the exhaust steam 40, and an injection system (not shown) connected to the tubing 25 for injecting ammonia into the vehicle exhaust. These components are well-understood by those skilled in the art.

In the alternate embodiments of FIGS. 2 and 3, the primary system 12 and the secondary system 22 both dose into the exhaust stream 40 downstream of the DPF 52. All other components and operations are similar to that of the embodiment of FIG. 1.

According to the disclosed systems, a method for reducing $NO_x$ in an exhaust stream can be generally understood. The method begins with the step of determining a need for $NO_x$ reduction in an exhaust stream. This can be done in a variety of ways using sensors to determine or approximate the $NO_x$ level of the exhaust stream. The method continues with determining the temperature of exhaust stream, which can be done simultaneously to determining or estimating the $NO_x$ level. Again, temperature sensors properly positioned provide a suitable means for determining the exhaust temperature. As previously stated, the sensor readings from these steps will determine the operation of the $NO_x$ reduction system 10. Based on the sensor system inputs, at least one of a primary reductant and a secondary reductant is dosed by injection into the exhaust stream.

In a particular embodiment, the primary reductant is injected into the exhaust stream, and a determination is made that the primary reductant is insufficient to reduce the $NO_x$ concentration to an acceptable level. Accordingly, the secondary reductant is then dosed into the exhaust stream, by injection, until the $NO_x$ level falls below a threshold level.

Where the sensor system indicates the temperature of the exhaust stream is below about 200° C., the primary reductant is initially injected into the exhaust stream. The secondary reductant is injected into the exhaust stream if the exhaust gas temperature is below this value, the DEF tank is frozen, the NPF is regenerating (dosing only to separated SCR brick), or if additional reductant is required in the SCR brick.

What is claimed is:

1. An exhaust after-treatment system comprising:
a primary NOx reducing system for delivering a reductant to an exhaust stream, the primary system having a primary flow control module;
a secondary NOx reducing system for delivering a reductant to an exhaust stream, the secondary system having a secondary flow control module;
the reductant in the primary NOx reducing system being different than the reductant in the secondary NOx reducing system;
a sensor system for determining relevant operating conditions and sending inputs representative of the conditions; and
an electronic control module for receiving sensor inputs and activating one of either the primary or the secondary flow control module based on sensor inputs.

2. The exhaust after-treatment system of claim 1, wherein the reductant in the primary NOx reducing system comprises urea.

3. The exhaust after-treatment system of claim 1, wherein the reductant in the secondary NOx reducing system comprises ammonia.

4. A supplemental NOx reduction device for use in an exhaust after-treatment system, the device comprising:
a refillable canister having a supply of ammonia;
a heating element coupled to the refillable canister;

a flow control module connected to the refillable canister for regulating the discharge of ammonia from the refillable canister;

tubing for fluidly connecting the refillable canister with a vehicle exhaust; an injection system connected to the tubing for injecting ammonia into the vehicle exhaust;

a sensor system for determining relevant operating conditions and sending inputs representative of the conditions; and an electronic control module for receiving sensor inputs and activating the flow control module based on sensor inputs, wherein the device is coupled to a vehicle exhaust line upstream of a DPF.

5. The supplemental NOx reduction device of claim 4, wherein the sensor system comprises at least one of an exhaust gas temperature sensor, an ambient temperature sensor, an exhaust gas NOx sensor, and a primary NOx reductant flow sensor.

6. The supplemental NOx reduction device of claim 4, wherein the device is coupled to a vehicle exhaust line upstream of a primary reductant source.

7. The supplemental NOx reduction device of claim 4, wherein the device is coupled to a vehicle exhaust line upstream of a NPF.

8. A method for reducing NOx in an exhaust stream, the method comprising the steps of:

determining a need for NOx reduction in an exhaust stream;

determining temperature of exhaust stream; and injecting at least one of a primary reductant and a secondary reductant into the exhaust stream based on the determined temperature of the exhaust stream.

9. The method of claim 8, wherein the primary reductant comprises urea and the secondary reductant comprises ammonia.

10. The method of claim 8, further comprising the steps of:

injecting the primary reductant into the exhaust stream;

determining the NOx level in the exhaust stream after injection of the primary reductant; and injecting the secondary reductant into the exhaust stream if the NOx level is above a threshold level.

11. The method of claim 8, wherein the primary reductant is injected into the exhaust stream when the determined temperature of the exhaust stream is in the range of from about 200° C. to about 500° C.

12. The method of claim 10, wherein the secondary reductant is injected into the exhaust stream when the determined temperature of the exhaust stream is either below about 200° C. or above about 500° C.

* * * * *